US009979943B2

(12) United States Patent
Miura

(10) Patent No.: US 9,979,943 B2
(45) Date of Patent: May 22, 2018

(54) IMAGE PROCESSING APPARATUS FOR APPLYING EMPHASIS EFFECT PROCESSING TO A SPECIFIC COMPONENT OF AN IMAGE SIGNAL, IMAGE PROCESSING METHOD AND IMAGE CAPTURE APPARATUS

(71) Applicant: CANON KABUSHIKI KAISHA, Tokyo (JP)

(72) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 15/217,505

(22) Filed: Jul. 22, 2016

(65) Prior Publication Data

US 2017/0034495 A1 Feb. 2, 2017

(30) Foreign Application Priority Data

Jul. 31, 2015 (JP) .................................. 2015-152695
Jul. 31, 2015 (JP) .................................. 2015-152696

(51) Int. Cl.
*H04N 5/232* (2006.01)
*H04N 9/73* (2006.01)
(Continued)

(52) U.S. Cl.
CPC ............. *H04N 9/735* (2013.01); *H04N 5/142* (2013.01); *H04N 5/208* (2013.01);
(Continued)

(58) Field of Classification Search
CPC ................................. H04N 9/735; H04N 5/142
(Continued)

(56) References Cited

U.S. PATENT DOCUMENTS

2009/0167956 A1 7/2009 Miyazawa
2010/0066869 A1 3/2010 Nakashima
(Continued)

FOREIGN PATENT DOCUMENTS

EP 1480449 A2 11/2004
JP 2002-196255 A 7/2002
(Continued)

OTHER PUBLICATIONS

European Partial Search Report dated Nov. 23, 2016, that issued in the corresponding European Patent Application No. 16177932.7.

*Primary Examiner* — Usman Khan
(74) *Attorney, Agent, or Firm* — Cowan, Liebowitz & Latman, P.C.

(57) ABSTRACT

In an image processing apparatus that can provide, to an image, an emphasis effect that serves as a focusing degree indicator, provision of an emphasis effect that is easily distinguished is realized. A signal generation circuit generates signals having values that correspond to the values of process target pixels of image signals. For example, based on the magnitude of a frequency component extracted from the image signals by an extraction circuit, a signal modification circuit applies signals to the process target pixels and outputs the process target pixels. The signal generation circuit generates signals so as to have values that decrease continuously or in a stepwise manner in accordance with increase in the values of the process target pixels.

12 Claims, 8 Drawing Sheets

(51) Int. Cl.
  *H04N 5/14*   (2006.01)
  *H04N 5/208*  (2006.01)
  *H04N 9/77*   (2006.01)
  *H04N 9/04*   (2006.01)

(52) U.S. Cl.
  CPC ......... *H04N 5/23212* (2013.01); *H04N 9/045* (2013.01); *H04N 9/77* (2013.01)

(58) Field of Classification Search
  USPC ...................................................... 348/354
  See application file for complete search history.

(56) References Cited

U.S. PATENT DOCUMENTS

2010/0266203 A1* 10/2010 Elhassani ............... H04N 5/142
                                                          382/168
2010/0295996 A1   11/2010 Chen et al.

FOREIGN PATENT DOCUMENTS

| JP | 2010-074549 A | 4/2010 |
| JP | 4474641 B     | 6/2010 |
| JP | 4977047 B     | 7/2012 |

* cited by examiner

IMAGE PROCESSING APPARATUS FOR APPLYING EMPHASIS EFFECT PROCESSING TO A SPECIFIC COMPONENT OF AN IMAGE SIGNAL, IMAGE PROCESSING METHOD AND IMAGE CAPTURE APPARATUS

BACKGROUND OF THE INVENTION

Field of the Invention

The present invention relates to an image processing apparatus, an image processing method and an image capture apparatus.

Description of the Related Art

Conventionally, in finder display of image capture apparatuses that use an image sensor, a function (sometimes referred to as a focus assist function) for making it easy to visually recognize in-focus areas is known. As a typical focus assist function, peaking (which may also be referred to as contour correction, edge enhancement, enhancer, focusing or the like) that displays high-frequency components of a shot image with emphasis is known (Japanese Patent No. 4474641).

Meanwhile, for ease of recognizing emphasized or highlighted areas, it has been suggested to lower the image signal level in a focus area, display a focus area in black and white (Japanese Patent No. 4977047), or display, in black and white, areas of which the level of high-frequency components is less than a certain level (Japanese Patent Laid-Open No. 2010-74549).

However, in all of these conventional techniques, the strength of the emphasis effect depends on the magnitude of the high-frequency components included in an image, and thus there has been a problem in that in an area that has fewer high-frequency components (the level or the amplitude of the high-frequency components is smaller) such as a low-luminance area, the emphasis effect is weak and difficult to distinguish. In addition, there has also been a problem in that in the case where an area having many high-frequency components has high luminance, the area is blown out due to the provision of an emphasis effect, and it is difficult to distinguish the emphasis effect.

Moreover, for ease of recognizing emphasized or highlighted areas, adding a color to an emphasis portion has also been suggested (Japanese Patent Laid-Open No. 2002-196255). However, in the case of applying a specific color to an emphasis portion, if the image includes a large number of high-frequency components, the entire screen becomes colored in the color of the emphasis portion, and thus there has been a problem in that it becomes difficult to recognize the in-focus state, and the user cannot perceive the original color of the object any longer.

SUMMARY OF THE INVENTION

The present invention provides an image processing apparatus, an image processing method, and an image capture apparatus that remedy one or more of these issues of conventional techniques.

According to an aspect of the present invention, there is provided an image processing apparatus comprising: a extraction unit configured to extract a predetermined frequency component from an image signal; a generation unit configured to generate a signal having a value that corresponds to a value of a process target pixel of the image signal; and an application unit configured to apply the signal generated by the generation unit to the process target pixel in accordance with a determination that is based on a magnitude of the frequency component extracted by the extraction unit, and output the process target pixel, wherein the generation unit generates the signal so as to have a value that decreases continuously or in a stepwise manner in accordance with an increase in the value of the process target pixel.

According to another aspect of the present invention, there is provided an image capture apparatus comprising: an image sensor; a display unit for continuously displaying a moving image captured by the image sensor; and an image processing apparatus comprising: a extraction unit configured to extract a predetermined frequency component from an image signal; a generation unit configured to generate a signal having a value that corresponds to a value of a process target pixel of the image signal; and an application unit configured to apply the signal generated by the generation unit to the process target pixel in accordance with a determination that is based on a magnitude of the frequency component extracted by the extraction unit, and output the process target pixel, wherein the generation unit generates the signal so as to have a value that decreases continuously or in a stepwise manner in accordance with an increase in the value of the process target pixel, wherein the extraction unit of the image processing apparatus performs the extracting on a signal of the moving image that is to be displayed on the display unit, and wherein an output of the application unit of the image processing apparatus is displayed on the display unit.

According to a further aspect of the present invention, there is provided an image processing method executed by an image processing apparatus, comprising: extracting a predetermined frequency component from an image signal; generating a signal having a value that corresponds to a value of a process target pixel of the image signal; and applying the generated signal to the process target pixel in accordance with a determination that is based on a magnitude of the extracted frequency component, and outputting the process target pixel, wherein in the generating, the signal is generated so as to have a value that decreases continuously or in a stepwise manner in accordance with an increase in the value of the process target pixel.

According to another aspect of the present invention, there is provided a non-transitory computer-readable storage medium storing a program for causing a computer to function as an image processing apparatus comprising: a extraction unit configured to extract a predetermined frequency component from an image signal; a generation unit configured to generate a signal having a value that corresponds to a value of a process target pixel of the image signal; and an application unit configured to apply the signal generated by the generation unit to the process target pixel in accordance with a determination that is based on a magnitude of the frequency component extracted by the extraction unit, and output the process target pixel, wherein the generation unit generates the signal so as to have a value that decreases continuously or in a stepwise manner in accordance with an increase in the value of the process target pixel.

According to a further aspect of the present invention, there is provided an image processing apparatus comprising: an extraction unit configured to extract a predetermined frequency component from an image signal; a generation unit configured to generate a signal for providing an emphasis effect to a process target pixel of the image signal; an adjustment unit configured to reduce a luminance and a saturation of the process target pixel; and an application unit configured to apply the signal generated by the generation unit to the process target pixel in accordance with a determination that is based on a magnitude of the frequency component extracted by the extraction unit, and output the process target pixel, wherein the application unit applies the signal to the process target pixel whose luminance and saturation are not reduced by the adjustment unit and outputs the process target pixel, and in a case of not applying the signal to the process target pixel, outputs the process target pixel whose luminance and saturation are reduced by the adjustment unit.

According to another aspect of the present invention, there is provided an image capture apparatus comprising: an image sensor; a display unit for continuously displaying a moving image captured by the image sensor; and an image processing apparatus comprising: an extraction unit configured to extract a predetermined frequency component from an image signal; a generation unit configured to generate a signal for providing an emphasis effect to a process target pixel of the image signal; an adjustment unit configured to reduce a luminance and a saturation of the process target pixel; and an application unit configured to apply the signal generated by the generation unit to the process target pixel in accordance with a determination that is based on a magnitude of the frequency component extracted by the extraction unit, and output the process target pixel, wherein the application unit applies the signal to the process target pixel whose luminance and saturation are not reduced by the adjustment unit and outputs the process target pixel, and in a case of not applying the signal to the process target pixel, outputs the process target pixel whose luminance and saturation are reduced by the adjustment unit, wherein the extraction unit of the image processing apparatus performs the extracting on a signal of the moving image that is to be displayed on the display unit, and wherein an output of the application unit of the image processing apparatus is displayed on the display unit.

According to a further aspect of the present invention, there is provided an image processing method executed by an image processing apparatus, comprising: extracting a predetermined frequency component from an image signal; generating a signal for providing an emphasis effect to a process target pixel of the image signal; and applying the signal to the process target pixel whose luminance and saturation are not reduced and outputting the process target pixel, or outputting the process target pixel without applying the signal to the process target pixel whose luminance and saturation are reduced, in accordance with determination that is based on a magnitude of the extracted frequency component.

According to another aspect of the present invention, there is provided a non-transitory computer-readable storage medium storing a program for causing a computer to function as an image processing apparatus comprising: an extraction unit configured to extract a predetermined frequency component from an image signal; a generation unit configured to generate a signal for providing an emphasis effect to a process target pixel of the image signal; an adjustment unit configured to reduce a luminance and a saturation of the process target pixel; and an application unit configured to apply the signal generated by the generation unit to the process target pixel in accordance with a determination that is based on a magnitude of the frequency component extracted by the extraction unit, and output the process target pixel, wherein the application unit applies the signal to the process target pixel whose luminance and saturation are not reduced by the adjustment unit and outputs the process target pixel, and in a case of not applying the signal to the process target pixel, outputs the process target pixel whose luminance and saturation are reduced by the adjustment unit.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that embodiments in which the present invention is applied to a focus assist function of a digital video camera as an example of an image processing apparatus will be described below, but an image capture function is not essential to the present invention. Moreover, the present invention is not limited to image capture apparatuses (including electronic devices that have an image capture function), and can be applied to any electronic devices that can obtain image data such as personal computers, tablet terminals, display devices, image adjustment apparatuses and mobile phones.

First Embodiment

Figure 1:
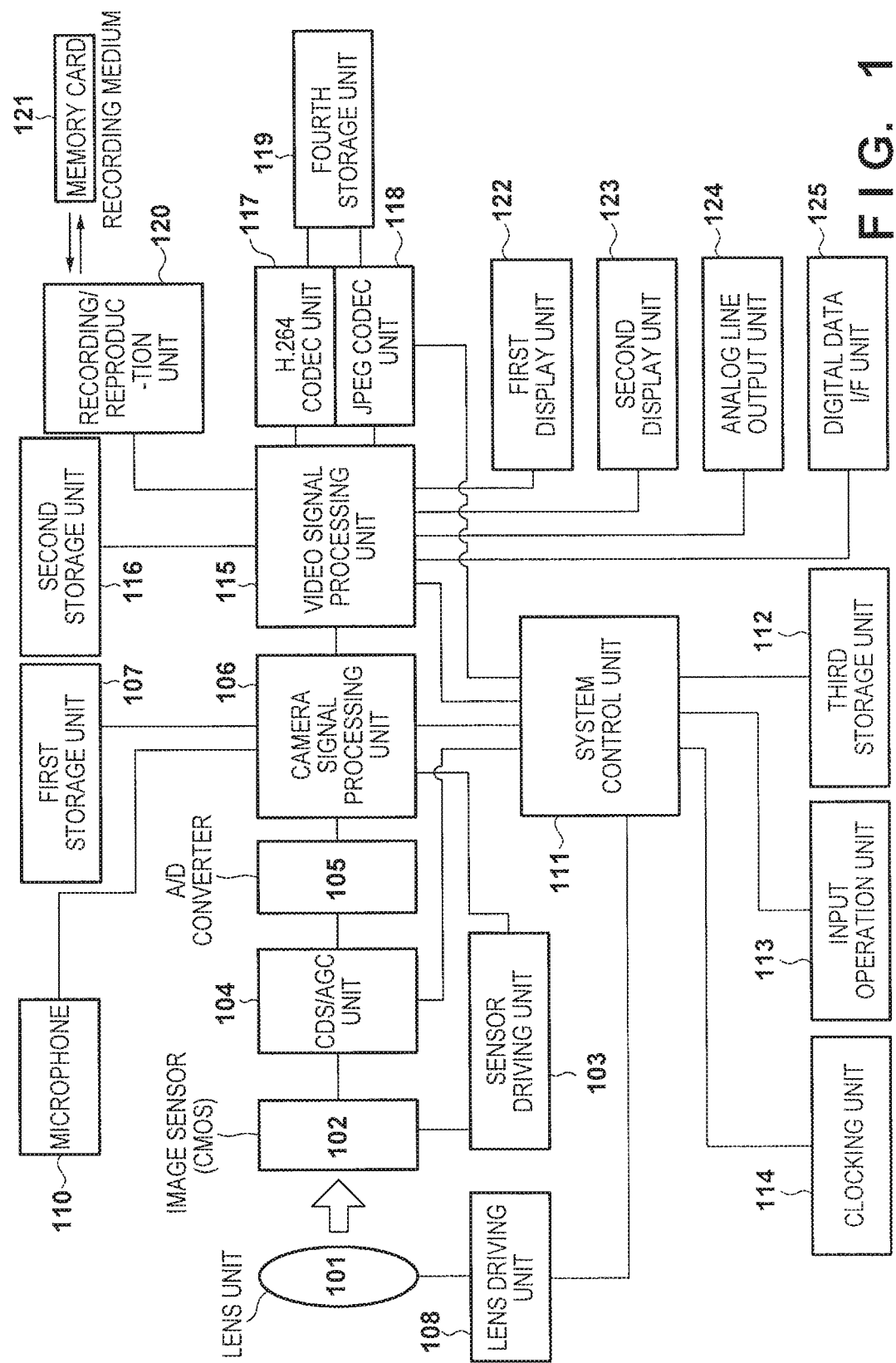
FIG. 1 is a block diagram showing a configuration example of a digital video camera as an example of an image processing apparatus according to an embodiment of the present invention.

FIG. 1 is a block diagram showing an example of the functional configuration of a digital video camera according to this embodiment. A lens unit 101 constitutes an optical system that forms an object image on the image capture plane of an image sensor 102, and has a zooming function, a focusing function, and a diaphragm adjustment function.

In the image sensor 102, a large number of photoelectric conversion elements are arranged two-dimensionally, and convert an object optical image formed by the lens unit 101 into image signals in units of pixels. The image sensor 102 may be a CMOS (Complementary Metal Oxide Semiconductor) image sensor or a CCD (Charged Coupled Device) image sensor, for example. Also, the image sensor 102 can realize an electronic shutter function by adjusting the electric charge accumulation time of the photoelectric conversion elements.

A sensor driving unit 103 controls the operations of the image sensor 102 in accordance with timings controlled by a camera signal processing unit 106. A CDS/AGC unit 104 performs correlated double sampling (CDS) on analog image signals from the image sensor 102 in order to reduce noise, and performs signal level gain control (Automatic Gain Control: AGC) in accordance with control by a system control unit 111. An A/D converter 105 converts the analog image signals output from the CDS/AGC unit 104 into digital image signals, and supplies the digital image signals to the camera signal processing unit 106. The camera signal processing unit 106 performs control related to an image capture function such as generation of timing signals, Auto Exposure (AE) control, gamma adjustment and Auto Focus (AF) control, in cooperation with the system control unit 111.

A first storage unit 107, a second storage unit 116, a third storage unit 112 and a fourth storage unit 119 are storage apparatuses (e.g., a semiconductor memory or a magnetic recording medium) respectively provided for performing camera signal processing, video control, system control, and encoding/decoding. These storages are shown as individual constituent elements in the figure, but the same storage apparatus may realize two or more of the first to fourth storages.

The camera signal processing unit 106 uses the first storage unit 107 as a frame memory when performing signal processing on a captured video image, for example. A lens driving unit 108 drives a motor and an actuator of the lens unit 101 and the like in accordance with control by the system control unit 111, and changes the zoom magnification (angle of view), focal distance and aperture value of the lens unit 101 and the like. The system control unit 111 controls the lens driving unit 108 based on a result of image signal processing performed by the camera signal processing unit 106. For example, during AF control, the system control unit 111 controls the lens driving unit 108 in order to move a focus lens of the lens unit 101 to a focal position that is based on an AF evaluation value obtained by the camera signal processing unit 106.

A microphone 110 is used for recording ambient sound, and sound signals from the microphone 110 are supplied to the camera signal processing unit 106. For example, in the case of recording sound from the microphone 110 along with images captured by the image sensor 102, the camera signal processing unit 106 synchronizes the images and the sound, and supplies the synchronized images and sound to a video signal processing unit 115.

The system control unit 111 is constituted by a programmable processor such as a CPU or an MPU, and realizes overall operations of a digital video camera by executing programs stored in the third storage unit 112, for example, and controlling functional blocks. The third storage unit 112 includes a ROM or RAM, for example, and stores programs that are executed by the system control unit 111, various settings, initial values and the like. Moreover, the third storage unit 112 is also used as a work area of the system control unit 111.

An input operation unit 113 is a user interface for a photographer to give an instruction to the digital video camera, and is provided with input devices such as keys and various operation buttons. A clocking unit 114 is provided with a real-time clock (RTC) and a backup battery, and returns date and time information in response to a request from the system control unit 111.

The video signal processing unit 115 performs control of display on a first display unit 122 and a second display unit 123 including adjustment of hue, saturation and brightness, control of output of an analog line output unit 124, control of output of a digital data I/F unit 125, control of a recording/reproduction unit 120, and the like. Moreover, the video signal processing unit 115 also performs conversion of the resolution of image signals, and generation of signals for superimposition (information such as a zebra pattern, contour signals and various setting values). The video signal processing unit 115 further performs control of display of OSDs (On Screen Displays) such as a menu screen and GUIs (Graphical User Interface).

The video signal processing unit 115 uses the second storage unit 116 as a frame memory, a work memory or the like for performing signal processing related to video baseband signals. The video signal processing unit 115 also executes signal processing related to processing for extracting a specific frequency component from a captured image, processing for providing an emphasis effect that serves as a focusing degree indicator to an image.

An H.264 codec unit 117 is an example of a moving image codec for performing encoding and decoding processing on moving images. The encoding format is not limited to H.264, and may be another format such as MPEG (Moving Picture Experts Group)-2. Similarly, a JPEG (Joint Photographic Experts Group) codec unit 118 is an example of a still image codec for performing encoding and decoding processing on still images. The encoding format is not limited to JPEG, and may be another format such as JPEG2000 or PNG (Portable Network Graphics).

Note that the JPEG codec unit 118 is connected to the video signal processing unit 115 in order to share some of the circuits with the H.264 codec unit 117 and in order to realize a function (capture function) of capturing a still image from a moving image reproduced by the H.264 codec unit 117. Note that the JPEG codec unit 118 may be directly connected to the camera signal processing unit 106. The H.264 codec unit 117 and the JPEG codec unit 118 use the fourth storage unit 119 for performing encoding and decoding processing on image signals.

The recording/reproduction unit 120 records, to a recording medium 121, recording data that has undergone encoding processing performed by the video signal processing unit 115 and the H.264 codec unit 117 (or the JPEG codec unit 118), and has been processed so as to have a data structure that corresponds to the recording format. Also, the recording/reproduction unit 120 reads out data from a moving image data file or a still image data file recorded in the recording medium 121. Note that the recording medium 121 is not limited to a memory card, and may be an optical recording medium, a magnetic storage apparatus (e.g., HDD), or a semiconductor storage apparatus (e.g., SSD).

The first display unit 122 and the second display unit 123 can display similar information. In this embodiment, assume that the first display unit 122 is a relatively large-sized display device that is provided on a side surface of a casing or the like so as to be able to be opened and closed, for example. The second display unit 123 is a display device smaller than the first display unit 122, and is provided inside the digital video camera so as to be viewed through eyepiece.

In a shooting mode, a shooting assisting image such as a frame that is based on the aspect ratio of a shot image or the like is superimposed on the first display unit 122 and the second display unit 123 in addition to a moving image (live view image) that is shot by the image sensor 102. By displaying the moving image shot by the image sensor 102 on the first display unit 122 and the second display unit 123, the first display unit 122 and the second display unit 123 are caused to function as an electronic view finder (EVF). On the other hand, in a playback mode, a moving image or still image recorded in the recording medium 121 is displayed on the first display unit 122 and the second display unit 123. Provision of an emphasis effect according to this embodiment can be executed on the image displayed on the first display unit 122 and the second display unit 123 regardless of whether the operation mode of the digital video camera is a shooting mode or a playback mode. In addition, information regarding the operation states and settings of the digital video camera, information regarding the captured images, various GUIs and the like are displayed on the first display unit 122 and the second display unit 123.

The analog line output unit 124 is a group of interfaces for performing analog component output, S terminal output, composite output and the like. A moving image or a still image shot or reproduced by the digital video camera can be output to an external apparatus by connecting the analog line output unit 124 to the external apparatus. The digital data I/F unit 125 can include one or more digital interfaces such as USB, SDI and HDMI (registered trademark). It is also possible to output, to an external apparatus, an object video image to which an emphasis effect to be described later is provided.

Next, processing for providing an emphasis effect in the digital video camera of this embodiment will be described with reference to FIGS. 2 to 3B. Note that the processing for providing an emphasis effect may be performed on a live view image when a focus assist function is enabled, or may be performed on a still image or moving image that is reproduced in the playback mode. In addition, in the case where the focus assist function is enabled, either manual focus or autofocus may be carried out.

Figure 2:
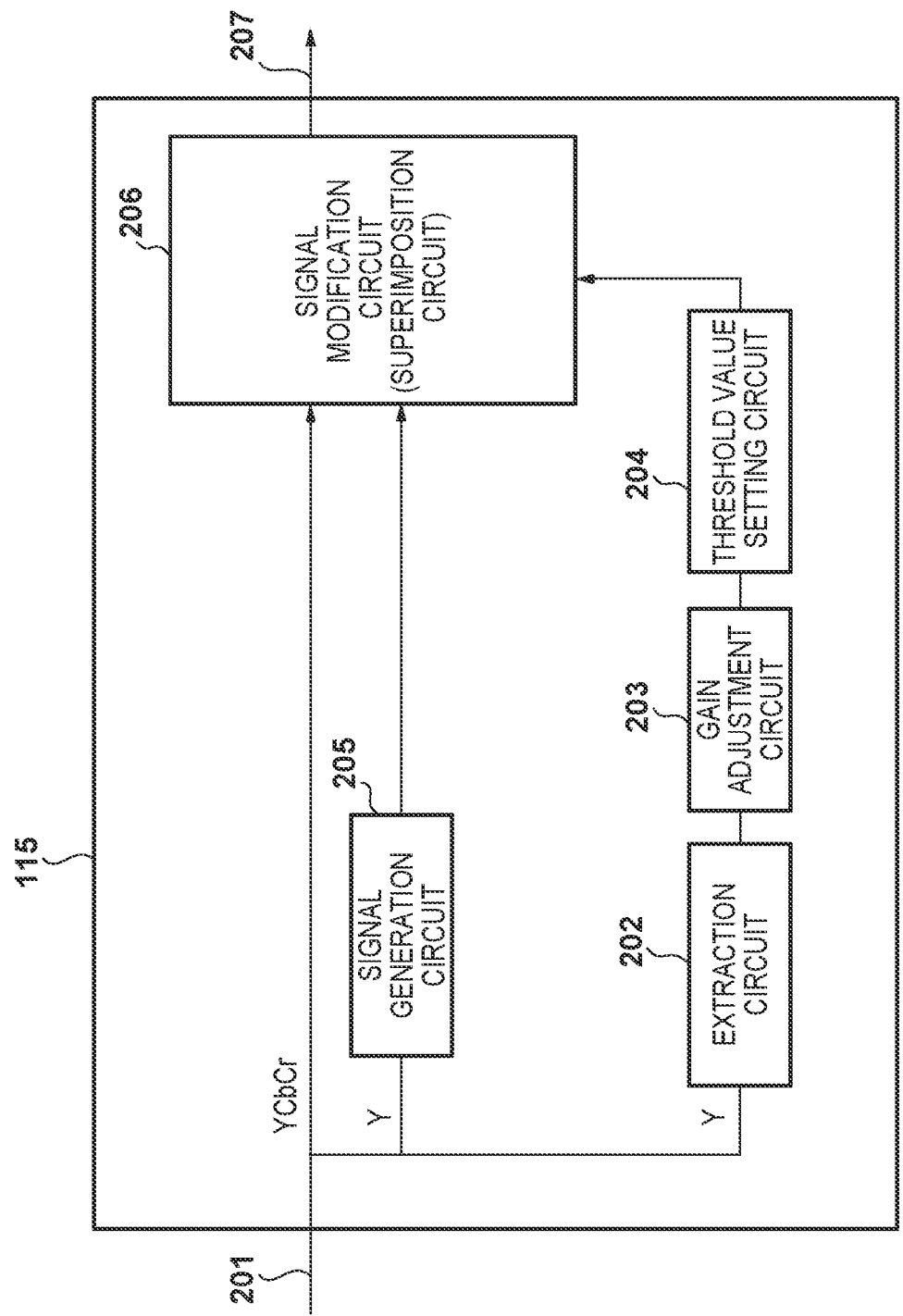
FIG. 2 is a block diagram showing a configuration example of a video signal processing unit in FIG. 1.

FIG. 2 is a block diagram schematically showing a functional block related to provision of an emphasis effect in the video signal processing unit 115 in FIG. 1.

Image signals 201 are input from the camera signal processing unit 106 in FIG. 1. The format of image signals input from the camera signal processing unit 106 is not limited, but here, assume that image signals in a format that is based on the luminance (Y) and color difference (Cb and Cr) are input.

An extraction circuit 202 extracts a predetermined frequency component from image signals. Note that the "frequency component" here refers to a "frequency band component", and is different from a single frequency component. The extraction circuit 202 is constituted by a band pass filter or a high pass filter, for example, and is assumed here to be constituted by a 3-tap FIR filter that uses tap coefficients "−1, 2, −1". Note that the frequency component extracted by the extraction circuit 202 may be any frequency component that can be used as a focusing degree indicator. In addition, the frequency characteristics of the extraction circuit 202 may be variable.

A gain adjustment circuit 203 adjusts the gain (amplification factor) of the frequency component extracted by the extraction circuit 202 to a predetermined value, for example. This gain can be adjusted by the user, and increasing the gain increases the number of pixels to which addition signals are applied. Hereinafter, for ease of description and understanding, it is assumed that the gain=1, that is, the gain adjustment circuit 203 outputs the frequency component extracted by the extraction circuit 202 without any change.

A threshold value setting circuit 204 prevents the addition signals from being applied to the noise component included in the frequency component extracted by the extraction circuit 202, by excluding values that exceed an upper limit threshold value and values that are smaller than a lower limit threshold value, those threshold values having been set in advance as a noise level, for example. The upper limit threshold value and the lower limit threshold value can also be adjusted by the user. Here, assume that predetermined default values have been set.

A signal generation circuit 205 generates addition signals that are to be applied to the luminance component of the pixels of the image signals 201 in a signal modification circuit 206. The signal generation circuit 205 generates addition signals at a level that corresponds to the luminance level of the image signals 201, specifically, addition signals at a low level when the luminance level is high, and addition signals at a high level when the luminance level is low.

The signal modification circuit 206 serving as an application means outputs image signals 207 to which an emphasis effect is provided, by applying (adding) the addition signals generated by the signal generation circuit 205 to, among the pixels of the image signals 201, pixels for which a preset condition (for example, a condition that the value is greater than or equal to a threshold value) is satisfied by the result of processing the frequency component extracted by the extraction circuit 202 using the gain adjustment circuit 203 and the threshold value setting circuit 204.

Unlike conventional techniques in which addition signals that depend on the high-frequency component extracted from image signals are applied to the original image signals, in the technique of this embodiment, addition signals that depend on the magnitude of the value of the original image signals are applied. In addition, for example, pixels having a specific frequency component whose magnitude is greater than or equal to a threshold value are selected as pixels to which the addition signals are to be applied (an emphasis effect is to be provided). Therefore, an emphasis effect in this embodiment is provided to pixels in which the focusing degree is greater than or equal to a certain value.

The signal modification circuit 206 outputs the image signals 207 (image signals for display) after being processed to the first display unit 122, the second display unit 123, the analog line output unit 124, the digital data I/F unit 125 and the like.

Figure 3A:
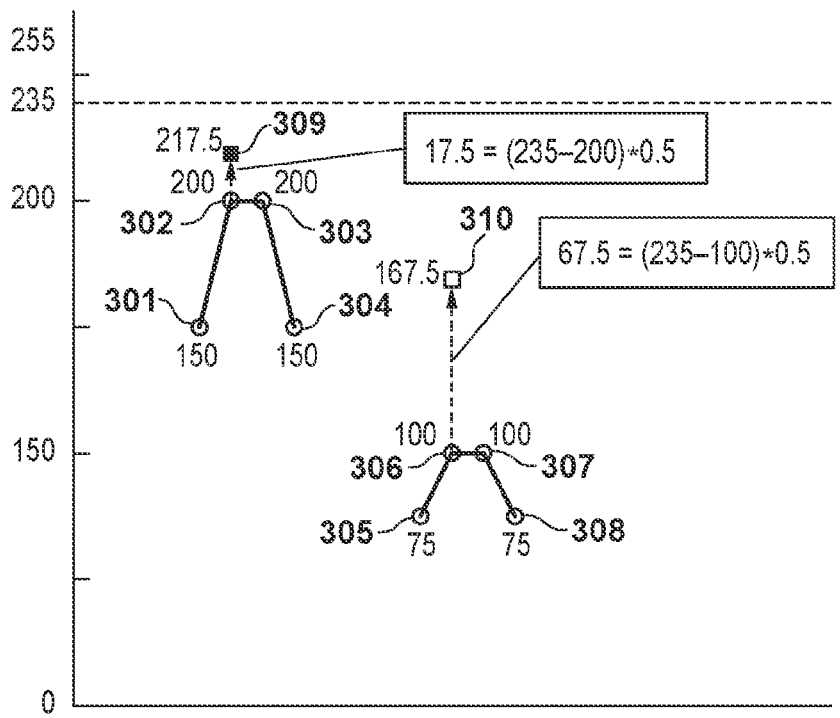
FIGS. 3A and 3B are schematic diagrams for describing generation of addition signals according to the embodiment and an effect thereof.
Figure 3B:
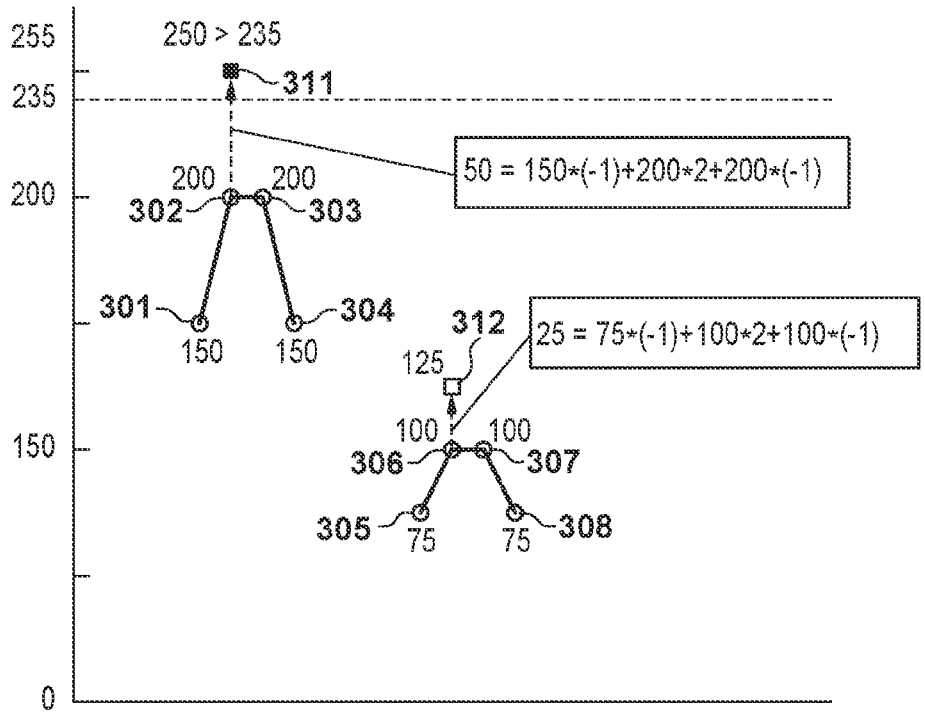

FIG. 3A is a diagram schematically showing the provision of an emphasis effect according to this embodiment, and FIG. 3B is a diagram schematically showing the provision of an emphasis effect according to a conventional technique. In FIGS. 3A and 3B, the horizontal axis indicates the direction of one horizontal line of an image, and the vertical axis indicates the luminance level (8 bit). Note that here, it is assumed that the image signals are obtained by converting RGB 8-bit image signals into the YCbCr format in compliance with ITU-R BT.601. Therefore, the luminance (Y) takes a value in the range of 16 to 235, and 235 is the saturated level.

Figure 4A:
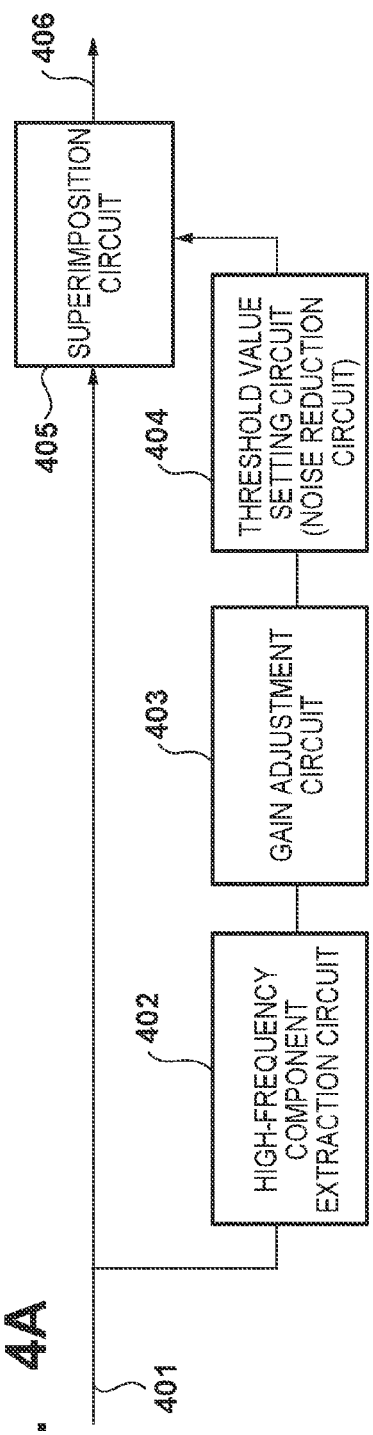
FIGS. 4A and 4B are block diagrams showing a configuration example of a video signal processing unit according to a modified example of the embodiment.

In FIGS. 3A and 3B, reference numerals 301 to 308 denote the luminance values of two continuous sections of four pixels included in a certain horizontal line. FIG. 4A schematically shows an example of a circuit for realizing a conventional technique shown in FIG. 3B for the purpose of comparing it with the video signal processing unit 115 (FIG. 2) for realizing the technique of this embodiment.

Image signals 401 are supplied to a superimposition circuit 405 and a high-frequency component extraction circuit 402. The high-frequency component of the luminance component extracted by the high-frequency component extraction circuit 402 is input to a gain adjustment circuit 403.

The gain adjustment circuit 403 adjusts the gain (amplification factor) of the high-frequency component extracted by the high-frequency component extraction circuit 402. This gain can be adjusted by the user, and for example, increasing the gain to be greater than 1 increases the value of addition signals, thus enhancing the emphasis effect.

A threshold value setting circuit 404 excludes, from the extracted high-frequency component, values that exceed an upper limit threshold value and values that are smaller than a lower limit threshold value, those threshold values having been set in advance as a noise level, for example. The upper limit threshold value and the lower limit threshold value can also be adjusted by the user. Here, assume that predetermined default values have been set.

The superimposition circuit 405 applies (adds) the high-frequency components (addition signals) supplied from the threshold value setting circuit 404 to the luminance components of the pixels of the image signals 401 that are input signals, while matching the timing phases, and thereby providing an emphasis effect.

Here, assume that the high-frequency component extraction circuit 402 is a 3-tap FIR filter using tap coefficients "−1, 2, −1", and that the gain of the gain adjustment circuit 403 is 1. In this case, with a pixel having a high luminance level such as a pixel 302 in FIGS. 3A and 3B, for example, the value (=50) of the high-frequency component that is extracted is also high, and if this value is applied (added) to the original pixel value, the saturated level (=235) will be exceeded. Therefore, it is not possible to distinguish between whether a contour portion that includes the high-frequency component of the object or the like is blown out at high luminance, or is showing an emphasis effect, and thus it becomes difficult to evaluate the focusing degree.

On the other hand, with a pixel having a low luminance level such as a pixel 306, the value (=25) of the high-frequency component that is extracted is also low. In this manner, in a conventional technique, the signal value that is added for providing an emphasis effect depends on the original pixel value, and the emphasis effect provided to pixels having a small value is also small, and thus the emphasis effect in a low luminance area also becomes difficult to recognize, for example.

Conversely, in the technique of this embodiment, addition signals having a value that does not depend on the magnitude of the value of the frequency component extracted by the extraction circuit 202 and that corresponds to the original pixel value are separately generated by the signal generation circuit 205. For example, the signal generation circuit 205 multiplies the magnitude of the difference between any fixed value (here, the highest value possible (saturation value), namely 235) and the luminance value of the input pixel signal by any gain (which is less than or equal to 1, and is 0.5 here) in order to generate addition signals. The larger the difference between the predetermined fixed value and the input signal value is, the larger the value the addition signals generated in this example have. For example, if the fixed value is a high value such as the saturation value, the value of the addition signal corresponding to the pixel 302 having a high luminance is smaller, and the value of addition signal corresponding to the pixel 306 having a low luminance is larger.

Therefore, although the value of a pixel 311 in which the saturated level was conventionally exceeded due to provision of an emphasis effect and the emphasis effect could not be distinguished, the value of a pixel 309 is at a level at which saturation does not occur, and it becomes possible to distinguish the emphasis effect. In addition, although a pixel 312 has a small value and thus is provided with a weak emphasis effect, which was difficult to distinguish, the pixel 310 is provided with a large emphasis effect, and thus the emphasis effect is easier to distinguish.

Note that the method for generating addition signals described here is merely an example, and addition signals can be generated using any other method as long as it is possible to suppress the saturation of pixels having a large value caused by an emphasis effect, while also imparting a sufficient emphasis effect to pixels having a small value. In the above-described example, the values of addition signals linearly decrease in accordance with linear increase in pixel values, but, for example, signals having values that decrease continuously or in a stepwise manner at least in accordance with the increase in pixel value can be used, such as the values of addition signals decreasing non-linearly or in a stepwise manner.

As described above, according to this embodiment, addition signals whose values increase as the pixel value becomes smaller are generated, and whether or not addition signals are to be applied (added) is determined based on the magnitude of a specific frequency component extracted from the pixel value. Therefore, the emphasis effect for a pixel having a low value becomes easy to distinguish, and it becomes possible to easily recognize the in-focus state in a low luminance portion, for example. In addition, by generating addition signals such that the values thereof becomes smaller as the pixel value is higher, it is possible to suppress the saturation of the pixel value due to providing an emphasis effect to pixels having a high value.

For example, even in a scene in which a high-luminance area and a low-luminance area exist at similar distances, an appropriate emphasis effect is provided to each of the areas, and thus it becomes possible to appropriately recognize the focusing degree. For example, by applying this embodiment to the frames of a moving image (a live view image or a moving image that is being recorded), a focus assist function for precise focusing can be realized. In addition, by applying this embodiment to a moving image or a still image that is being reproduced, a function of easily recognizing a portion that is in focus can be realized.

Note that an example was described here in which the frequency component that is used as a criterion to determine whether or not to provide an emphasis effect is extracted from the luminance component of the pixels, but a frequency component may be extracted from other components. For example, if image signals are in the RGB format, a frequency component may be extracted from the G (green) component or may be individually extracted from the R (red), G (green) and B (blue) components. In the case of extracting a frequency component from a plurality of components, a configuration can be adopted in which an emphasis effect is provided to pixels in which any one of the components satisfies a condition, for example.

Second Embodiment

Next, a second embodiment of the present invention will be described. This embodiment is different from the first embodiment in that a video signal processing unit reduces the luminance and saturation of pixels to which an emphasis effect is not provided and then outputs the pixels. Other constituent elements may be common with the first embodiment, and thus the configuration and operations of the video signal processing unit in this embodiment will be described below.

Figure 5:
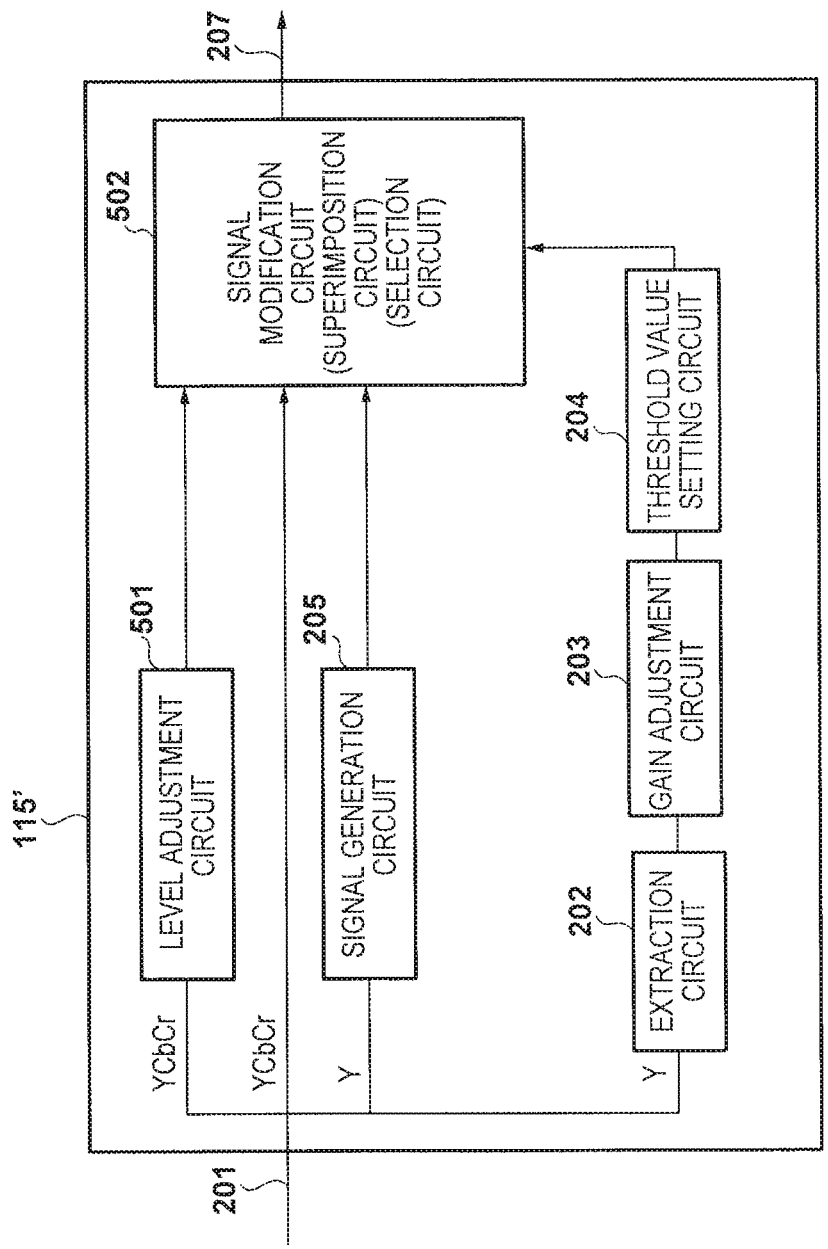
FIG. 5 is a block diagram showing a configuration example of a video signal processing unit according to a second embodiment.

FIG. 5 is a block diagram showing an example of the functional configuration of a video signal processing unit 115' in this embodiment, and the same reference numerals are assigned to the same constituent elements as the first embodiment, and redundant descriptions will not be given.

The configuration in this embodiment is different from that in the first embodiment in that a level adjustment circuit 501 is added to the video signal processing unit 115 of the first embodiment, and the operations of a signal modification circuit 502 are different.

Specifically, the signal modification circuit 502 of this embodiment replaces pixel values to which an emphasis effect is not provided with pixel values that underwent level adjustment by the level adjustment circuit 501, in addition to an operation of providing an emphasis effect similar to the first embodiment. Moreover, the signal modification circuit 502 of this embodiment further adjusts the luminance and saturation of pixels to which an emphasis effect is to be provided, as necessary.

The level adjustment circuit 501 reduces the luminance and saturation of each of the pixels of an input image by a predetermined amount, and outputs the image. The reducing amount is determined in advance to be in a range in which the reduction can be perceived and visual recognizability of the original image does not extremely deteriorate. In addition, the reducing amount may also be dynamically determined based on the average luminance of the entire input image. For example, regarding the luminance, the reducing amount may correspond to 0.5 to 1 EV, and for example, regarding the saturation, in the case where the saturation is expressed by 0 to 100%, where an achromatic color corresponds to 0%, the reducing amount may be in a range of 0 to 75% (in the case of 0%, the image is displayed in gray scale). Note that these are merely examples, and other values can be used.

For example, in the case of applying this embodiment to the frames of a moving image (a live view image or a moving image that is being recorded) and realizing a focus assist function, an area in which the focusing degree is low is displayed in a state in which the saturation and luminance are reduced. When the focusing degree increases due to a manual or autofocus function, and the magnitude of the frequency components that have been extracted satisfies a predetermined condition, addition signals generated similarly to the first embodiment are applied, and an emphasis effect is provided. For pixels for which output from the threshold value setting circuit 204 satisfies the condition, the signal modification circuit 502 selects not output of the level adjustment circuit 501, but the image signals 201 that have been input, and applies (adds) addition signals.

Accordingly, pixels in which the focusing degree is high will have the original pixel values (that have not undergone level adjustment) and are also applied with the addition signals. Therefore, due to a combination of change in color (increase in saturation) and increase in luminance, an emphasis effect, which causes a portion of which focusing degree changes from low to high to appear to transition from a shadowed state to a brightly illuminated state, can be provided. Therefore, even if another color is not added, the area in which the focusing degree is high can be easily distinguished, and the issue of the deterioration of the visual recognizability of the object due to an emphasis effect does not arise.

Note that due to the luminance of pixels increasing to be greater than the original value by applying addition signals, the color of the pixels becomes lighter than the original color. Therefore, in the signal modification circuit 502, a configuration may be adopted in which the saturation is increased to be higher than the original value, such that color after applying addition signals visually approaches the original color (color before applying the addition signals).

As described above, according to this embodiment, in addition to the configuration of the first embodiment, the luminance and saturation of pixels to which an emphasis effect is not provided are reduced, and the luminance and saturation of pixels to which an emphasis effect is provided are not reduced. Therefore, in addition to the effects according to the first embodiment, it is possible to realize an effect in which an emphasis effect can be provided so as to enable an area having a high focusing degree to be easily distinguished without deteriorating the visual recognizability.

Modified Example 1

Note that the effect of the second embodiment, which is obtained by reducing the luminance and saturation of pixels to which an emphasis effect is not provided and not reducing the luminance and saturation of pixels to which an emphasis effect is provided, is obtained also in the case of providing an emphasis effect using addition signals that are based on extracted high-frequency components.

Figure 4B:
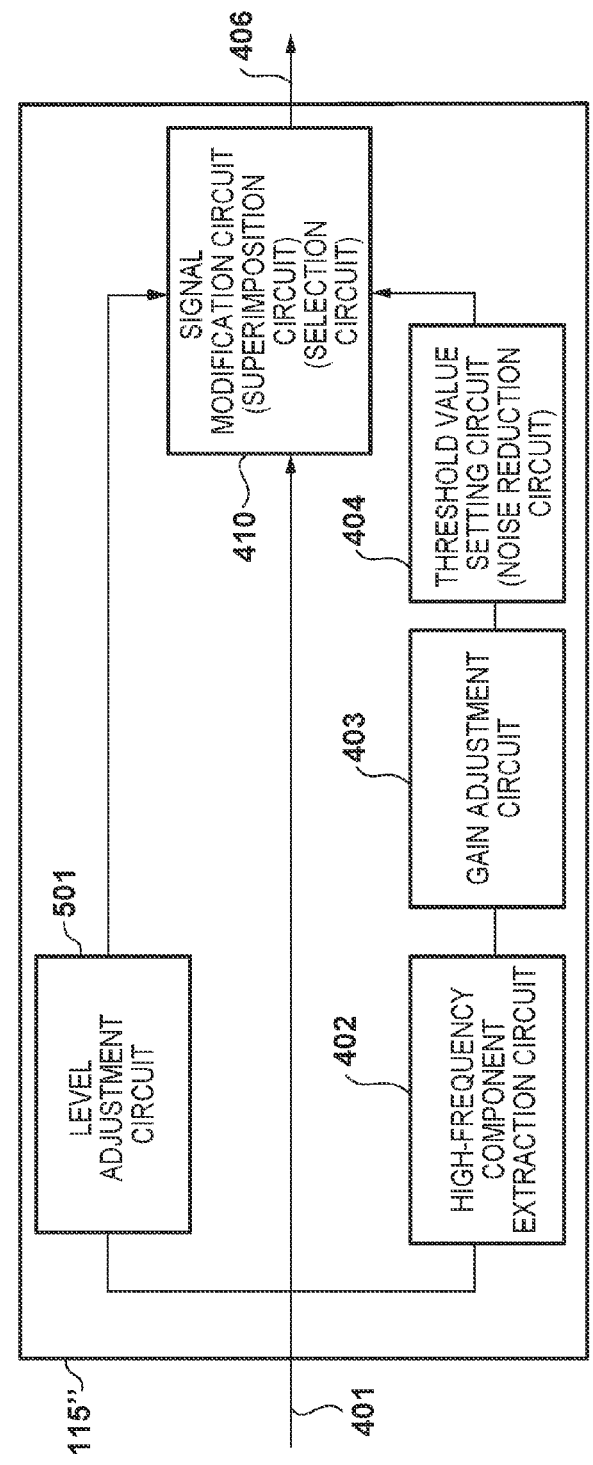

FIG. 4B is a block diagram of a video signal processing unit 115" in the case where the level adjustment technique of the second embodiment is applied to a configuration in which an emphasis effect is provided using addition signals that are based on extracted high-frequency components. The same constituent elements as those in FIGS. 4A and 5 have the same reference numerals, and description thereof is omitted.

A signal modification circuit 410 determines whether or not to provide an emphasis effect to target pixels, similarly to the signal modification circuit 502 in the second embodiment. In the case where it is determined that an emphasis effect is to be provided, the signal modification circuit 410 then applies high-frequency components input from the threshold value setting circuit 404 to the pixel signals that have been input without being changed, not to output of the level adjustment circuit 501, and outputs the pixel signals. Moreover, in the case where it is determined that an emphasis effect is not to be provided, the signal modification circuit 410 selects output of the level adjustment circuit 501 (pixel signals that have undergone level adjustment) and outputs the pixel signals.

In this manner, also in the case of generating addition signals based on extracted high-frequency components, a configuration is possible in which pixels having a low focusing degree are displayed with reduced luminance and saturation, and when the focusing degree becomes high, addition signals are applied and in addition, the luminance and saturation are increased. Accordingly, it is possible to realize an effect in which an emphasis effect can be provided so as to enable an area having a high focusing degree to be easily distinguished without deteriorating the visual recognizability.

Other Embodiments

In the above-described first and second embodiments, a configuration is adopted in which one frequency component is extracted by an extraction circuit, and it is determined whether or not to provide an emphasis effect. However, a configuration is also possible in which a plurality of frequency components are extracted, and it is determined whether or not to provide an emphasis effect for each of the frequency components.

Figure 6A:
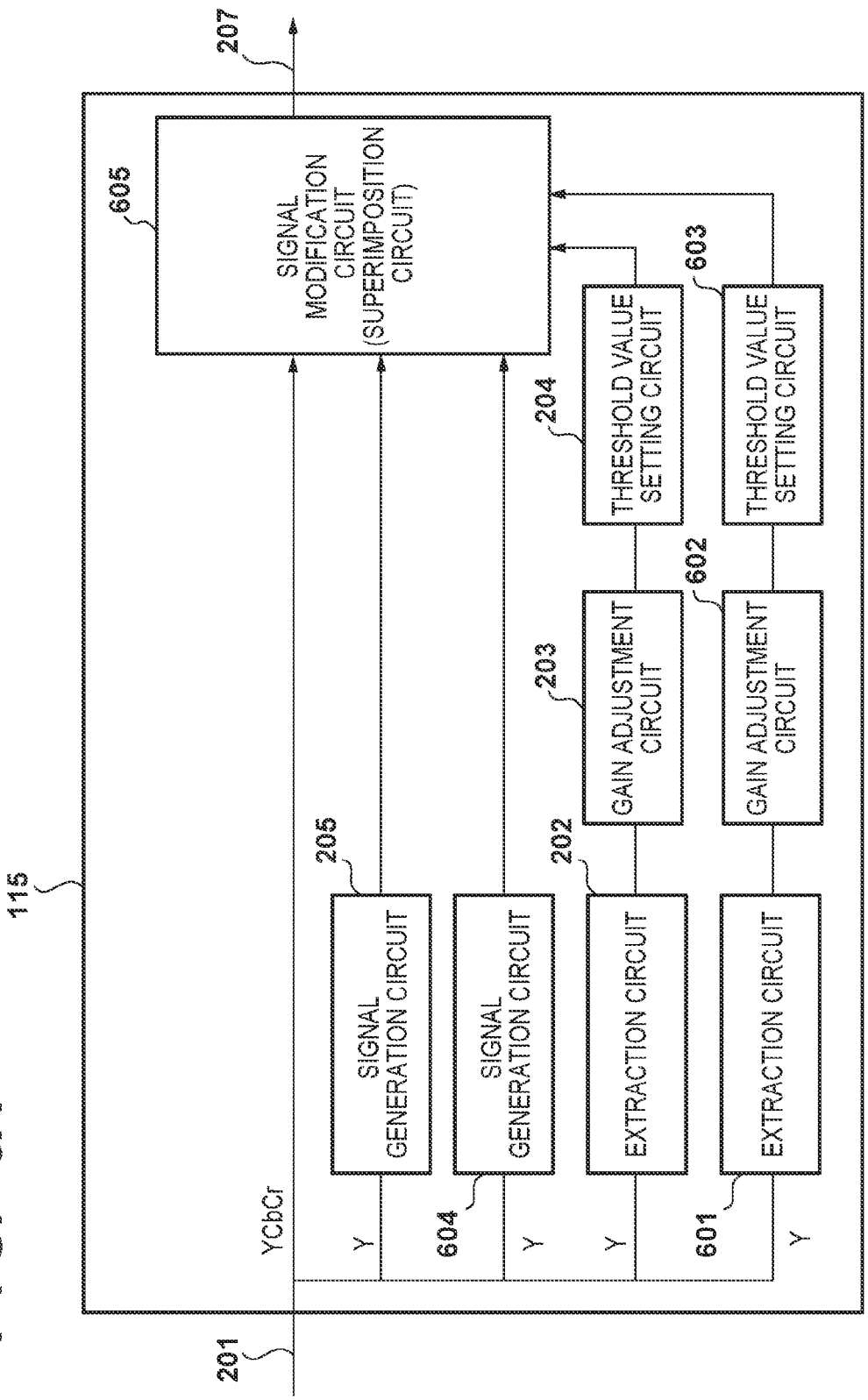
FIGS. 6A and 6B are block diagrams showing a configuration example of a video signal processing unit according to another embodiment.
Figure 6B:
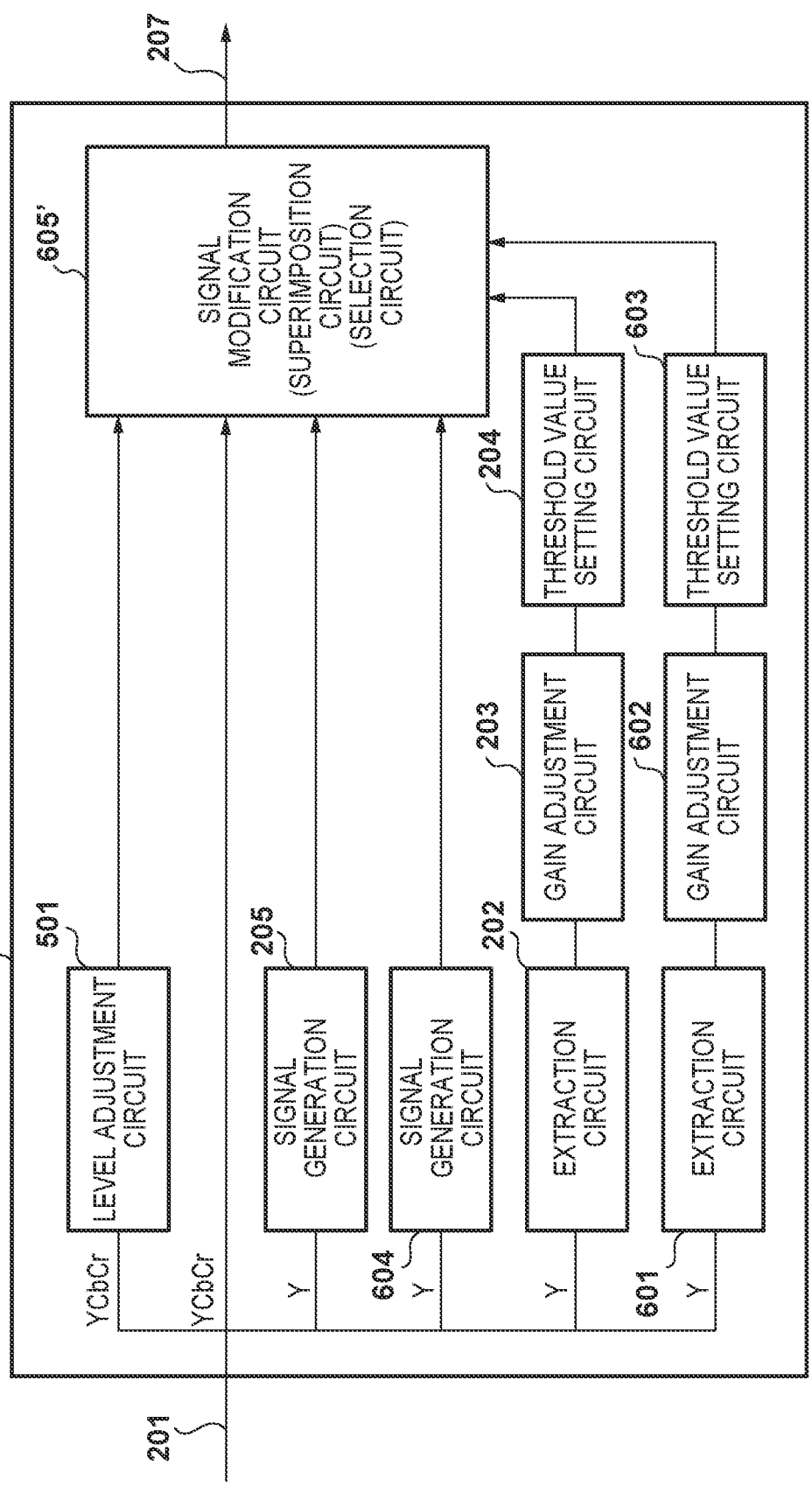

FIGS. 6A and 6B show a configuration example of the video signal processing unit 115 according to another embodiment such as this, where FIG. 6A corresponds to the first embodiment, and FIG. 6B corresponds to the second embodiment. In FIGS. 6A and 6B, an extraction circuit 601 extracts a frequency component (referred to as a second frequency component) that is different from the frequency component (referred to as a first frequency component) extracted by the extraction circuit 202. A gain adjustment circuit 602 and a threshold value setting circuit 603 have the same configuration as the gain adjustment circuit 203 and the threshold value setting circuit 204, and can set a gain for the second frequency component and a threshold value for noise reduction.

The signal generation circuit 205 is associated with the extraction circuit 202, and generates addition signals to be applied to pixels whose first frequency component satisfies the condition. Also, a signal generation circuit 604 is associated with the extraction circuit 601, and generates addition signals to be applied to pixels whose second frequency component satisfies the condition. The signal generation circuit 604 generates addition signals that are based on the original pixel value, similarly to the signal generation circuit 205, but may be configured so as to generate addition signals having different values, such as by changing the above-described fixed value to a lower value.

Signal modification circuits 605 and 605' perform operations similar to those of the signal modification circuits 206 and 502, but the signal modification circuits 605 and 605' are different from the signal modification circuits 206 and 502 in that it is determined, in accordance with the magnitude of each of the frequency components that have been extracted, whether or not provision of an emphasis effect to target pixels is necessary, and addition signals corresponding to the frequency components are applied. In other words, an emphasis effect can be independently provided to each of the frequency components that are extracted.

For example, in the case where a high-contrast object and a low-contrast object exist together, if it is determined based on one frequency component whether or not provision of an emphasis effect is necessary, a case is conceivable in which it becomes difficult to provide an emphasis effect to the object having low contrast. However, by extracting a plurality of frequency components, and determining, based on a determination criterion for each of the frequency components, whether or not provision of an emphasis effect is necessary, an emphasis effect can appropriately be provided also in a scene in which an object having low contrast and an object having high contrast exist together.

For example, assume that the first frequency component is a component that has a higher frequency than the second frequency component. In this case, first, the magnitude of the second frequency component will satisfy the condition, and then the magnitude of the first frequency component will satisfy the condition. Therefore, first, in accordance with the determination that is based on the magnitude of the second frequency, an emphasis effect is provided to the object having low contrast and the object having high contrast, and after that, for the object having high contrast, a switch is made to an emphasis effect that is in accordance with the determination that is based on the magnitude of the first frequency. Therefore, not only does it become possible to distinguish the focusing degree for the object having low contrast, but also an emphasis effect is switched as the focusing degree of the object having high contrast increases, and it is possible to provide a focus assist function for assisting even more precise focusing.

Note that in the configuration in FIG. 6B (corresponding to the second embodiment), the signal modification circuit 605' determines whether or not to select output of the level adjustment circuit 501 as well in accordance with the magnitude of each of the frequency components.

The present invention was described in detail based on its exemplary embodiments, but the present invention is not limited to these specific embodiments, and various changes that fall within the scope of the claims can be made. In addition, a configuration may be adopted in which it is possible to switch between an embodiment in which level adjustment is performed and an embodiment in which level adjustment is not performed, or a configuration may be adopted in which it is possible to switch between a configuration for generating addition signals in accordance with an embodiment and a configuration for generating addition signals from extracted frequency components.

For example, an operation of providing an emphasis effect according to the above embodiments can be applied to things other than a focus assist function. For example, the operation may be applied to a moving image or a still image that has been recorded, and be used for explicitly indicating an in-focus area. Also, the operation may be applied to image data whose in-focus area can be changed after being shot, such as image data shot by a light field camera. In this case, by applying the operation of providing an emphasis effect according to an embodiment to a still image that is reconstructed (a refocused image) every time a virtual image plane is changed, it is possible to assist obtaining a refocused image in which a desired object is in focus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Figure 7:
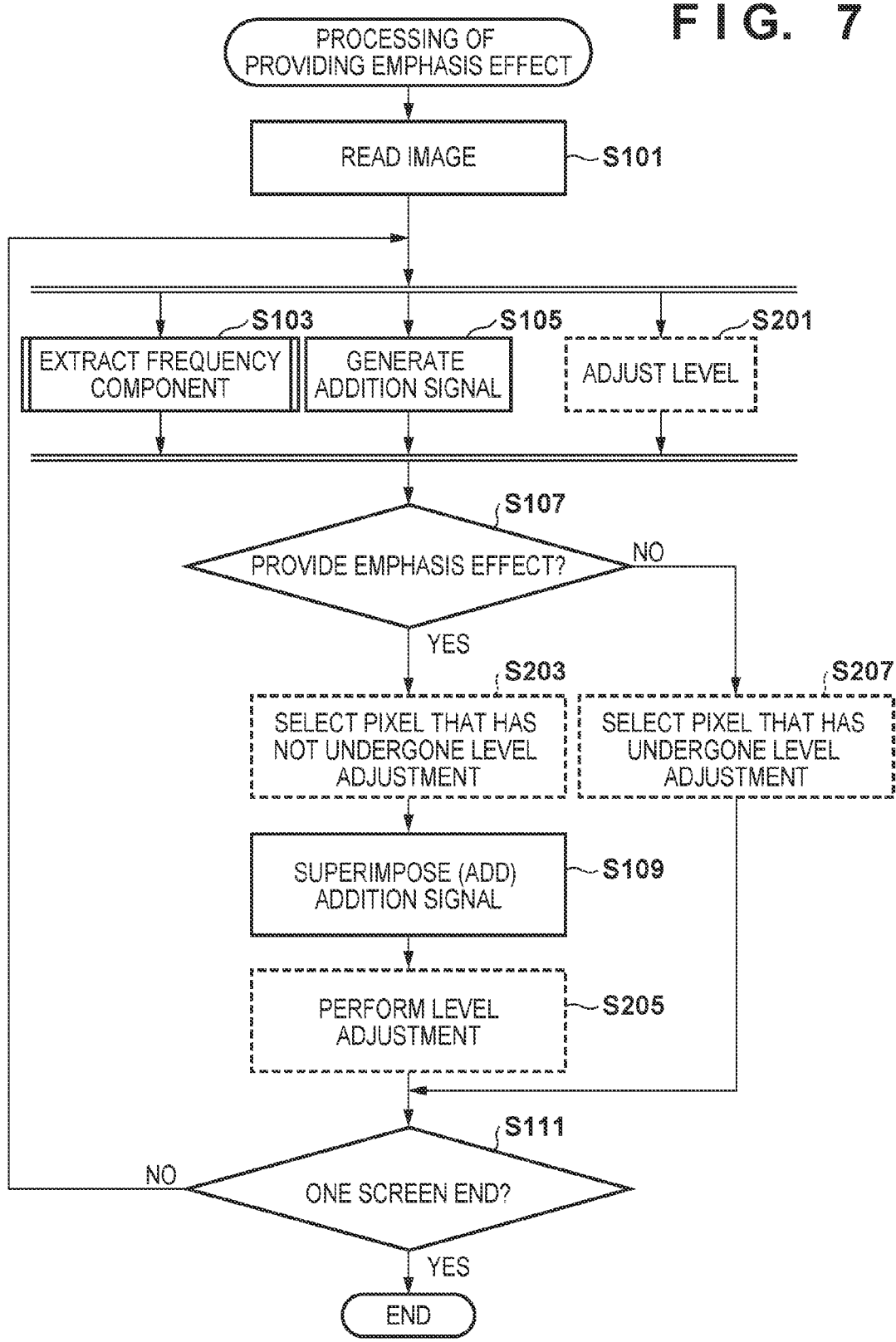
FIG. 7 is a flowchart of emphasis effect providing processing according to the embodiments.

For example, the video signal processing unit 115 according to the above embodiments can be constituted by a CPU, an MPU or a processor that can be dynamically reconfigured with software (hereinafter, representatively referred to as a CPU). In this case, the CPU can operate as shown in the flowchart in FIG. 7, by loading a program stored in a non-volatile storage apparatus to the RAM and executing the program. Note that in FIG. 7, steps indicated by dotted lines represent steps executed in the second embodiment and its modified example.

In step S101, the CPU reads the entirety of a process target image (one frame) into a memory, and executes the following processing for each pixel. Steps S103, S105, and S201 are steps in which processing is performed substantially in parallel. In step S103, the CPU performs processing of extracting a frequency component. This step includes frequency component extraction, gain application, and noise reduction, and corresponds to the operations of the circuits 202 to 204, 402 to 404, 601 to 603.

In step S105, the CPU generates an addition signal that is based on the value of the process target pixel. This operation corresponds to the operations of the signal generation circuits 205 and 604. In addition, in the case of realizing an embodiment in which level adjustment is used, the CPU executes processing for reducing the luminance and saturation of the process target pixel in step S201. This processing corresponds to the operation of the level adjustment circuit 501.

In step S107, the CPU determines whether or not to provide an emphasis effect to the process target pixel based on the determination whether or not the magnitude of the value obtained in the processing of extracting a frequency component satisfies a predetermined condition (e.g., a threshold value is exceeded). For example, in the case where it is determined that the predetermined condition is not satisfied and an emphasis effect is not to be provided, the CPU executes step S207 as necessary, and then advances the procedure to step S111. Step S207 is executed in an embodiment in which level adjustment is used, and the CPU replaces the process target pixel with a pixel that has undergone level adjustment processing, and outputs the pixel (or selects a pixel that has undergone level adjustment as the pixel after being processed).

On the other hand, for example, in the case where it is determined that the predetermined condition is satisfied and an emphasis effect is to be provided, the CPU executes step S203 as necessary, and then advances the procedure to step S109. Step S203 is executed in an embodiment in which level adjustment is used, and the CPU outputs the process target pixel as is (or selects a pixel that has not undergone level adjustment as the pixel after being processed).

In step S109, the CPU applies the addition signal generated in step S105 to the process target pixel. Specifically, the CPU adds the value calculated in step S105 to the luminance component of the process target pixel. After that, the CPU executes step S205 as necessary, and then advances the procedure to step S111. Step S205 is executed as necessary in an embodiment in which level adjustment is used, and in the case where the color is changed from the original color due to application of the addition signal, the saturation of the process target pixel is increased so as to be perceived as the same as the original color.

In step S111, the CPU determines whether or not the processing has been applied to all the pixels of one screen. If there is a pixel that has not been processed, the procedure is returned to steps S103 to S201, and if there is no pixel that has not been processed, the processing for one screen is ended. Regarding a moving image, similar processing is repeated for each frame, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-152695 and 2015-152696, filed on Jul. 31, 2015, which are hereby incorporated by reference herein in their entirety.

What is claimed is:

1. An image processing apparatus comprising:
one or more processors;
a memory that stores a program executable by the one or more processors;
wherein the program, when executed by the one or more processors, causes the one or more processors to function as:
an extraction unit configured to extract a predetermined frequency component from a component of an image signal;
a generation unit configured to generate an emphasis-effect signal for providing an emphasis effect to the image signal from said component of the image signal; and
an application unit configured to apply the emphasis-effect signal to a process target pixel of the image signal by adding the emphasis-effect signal to said component of the process target pixel, wherein the process target pixel is, among the pixels of the image signal, a pixel for which a magnitude of the frequency component extracted by the extraction unit is greater than a predetermined threshold value, and output the process target pixel upon which the emphasis-effect signal is applied,
wherein the generation unit is configured to generate the emphasis-effect signal by multiplying a gain by a difference between a predetermined fixed value and the value of said component of the process target pixel so as to have a value that decreases continuously or in a stepwise manner in accordance with an increase in the value of said component of the process target pixel.

2. The image processing apparatus according to claim 1, wherein
the fixed value is the largest value that said component of the process target pixel can have.

3. The image processing apparatus according to claim 1, wherein the program, when executed by the one or more processors, causes the one or more processors to further function as:
an adjustment unit configured to reduce a luminance and a saturation of a pixel other than the process target pixel,
wherein the application unit is configured to apply the emphasis-effect signal to the process target pixel whose luminance and saturation are not reduced by the adjustment unit, and to output the process target pixel, and
wherein the application unit is configured to not apply the emphasis-effect signal to the pixel other than the process target pixel, and to output the pixel other than the process target pixel whose luminance and saturation are reduced by the adjustment unit.

4. The image processing apparatus according to claim 3, wherein
in a case where a color of the process target pixel changes due to application of the emphasis-effect signal, the application unit is configured to increase the saturation of the process target pixel such that the color of the process target pixel after applying the signal is perceived as being close to the color before applying the signal.

5. The image processing apparatus according to claim 1, wherein the program, when executed by the one or more processors, causes the one or more processors to function as a plurality of the extraction unit and the generation unit, and wherein:

each of the extraction unit is configured to extract a different frequency component, each of the generation unit is associated with a different one of the extraction unit, and the application unit is configured to apply the emphasis-effect signal generated by each of the generation unit to the process target pixel for which the magnitude of the frequency component extracted by the associated extraction unit is greater than the predetermined threshold value, and to output the process target pixel upon which the emphasis-effect signal is applied.

6. The image processing apparatus according to claim 1, wherein the image signal is a signal of a moving image or a still image.

7. The image processing apparatus according to claim 6, wherein the moving image is a live view image.

8. The image processing apparatus according to claim 6, wherein the image signal is a signal of a refocused image.

9. An image capture apparatus comprising:

an image sensor;

a display unit for continuously displaying a moving image captured by the image sensor; and an image processing apparatus comprising:

one or more processors;

a memory that stores a program executable by the one or more processors;

wherein the program, when executed by the one or more processors, cause the one or more processors to function as:

an extraction unit configured to extract a predetermined frequency component from a component of an image signal;

a generation unit configured to generate an emphasis-effect signal for providing an emphasis effect to the image signal from said component of the image signal; and an application unit configured to apply the emphasis-effect signal to a process target pixel of the image signal by adding the emphasis-effect signal to said component of the process target pixel, wherein the process target pixel is, among the pixels of the image signal, a pixel for which a magnitude of the frequency component extracted by the extraction unit is greater than a predetermined threshold value, and output the process target pixel upon which the emphasis-effect signal is applied, wherein the generation unit is configured to generate the emphasis-effect signal by multiplying a gain by a difference between a predetermined fixed value and the value of said component of the process target pixel so as to have a value that decreases continuously or in a stepwise manner in accordance with an increase in the value of said component of the process target pixel, wherein the extraction unit of the image processing apparatus is configured to perform the extracting on a signal of the moving image that is to be displayed on the display unit, and wherein an output of the application unit of the image processing apparatus is displayed on the display unit.

10. The image capture apparatus according to claim 9, wherein the image capture apparatus is configured to display the output of the application unit of the image processing apparatus on the display unit in a case where a focus assist function is enabled.

11. An image processing method executed by an image processing apparatus, comprising:

extracting a predetermined frequency component from a component of an image signal;

generating an emphasis-effect signal for providing an emphasis effect to the image signal from said component of the image signal; and applying the generated emphasis-effect signal to a process target pixel of the image signal by adding the emphasis-effect signal to said component of the process target pixel, wherein the process target pixel is, among the pixels of the image signal, a pixel for which a magnitude of the extracted frequency component is greater than a predetermined threshold value, and outputting the process target pixel upon which the emphasis-effect signal is applied, wherein, in the generating, the emphasis-effect signal is generated by multiplying a gain by a difference between a predetermined fixed value and the value of said component of the process target pixel so as to have a value that decreases continuously or in a stepwise manner in accordance with an increase in the value of said component of the process target pixel.

12. A non-transitory computer-readable storage medium storing a program for causing a computer to function as an image processing apparatus comprising:

an extraction unit configured to extract a predetermined frequency component from a component of an image signal;

a generation unit configured to generate an emphasis-effect signal for providing an emphasis effect to the image signal from said component of the image signal; and an application unit configured to apply the emphasis-effect signal to a process target pixel of the image signal by adding the emphasis-effect signal to said component of the process target pixel, wherein the process target pixel is, among the pixels of the image signal, a pixel for which a magnitude of the frequency component extracted by the extraction unit is greater than a predetermined threshold value, and output the process target pixel upon which the emphasis-effect signal is applied, wherein the generation unit is configured to generate the emphasis-effect signal by multiplying a gain by a difference between a predetermined fixed value and the value of said component of the process target pixel so as to have a value that decreases continuously or in a stepwise manner in accordance with an increase in the value of said component of the process target pixel.

* * * * *